Jan. 16, 1940.  R. L. MELTON ET AL  2,187,624
APPARATUS FOR THE MANUFACTURE OF COATED WEBS
Filed Oct. 10, 1932   2 Sheets-Sheet 1

INVENTORS
ROMIE L. MELTON
RAYMOND C. BENNER
HENRY P. KIRCHNER
BY
ATTORNEY

Jan. 16, 1940.  R. L. MELTON ET AL  2,187,624
APPARATUS FOR THE MANUFACTURE OF COATED WEBS
Filed Oct. 10, 1932  2 Sheets-Sheet 2
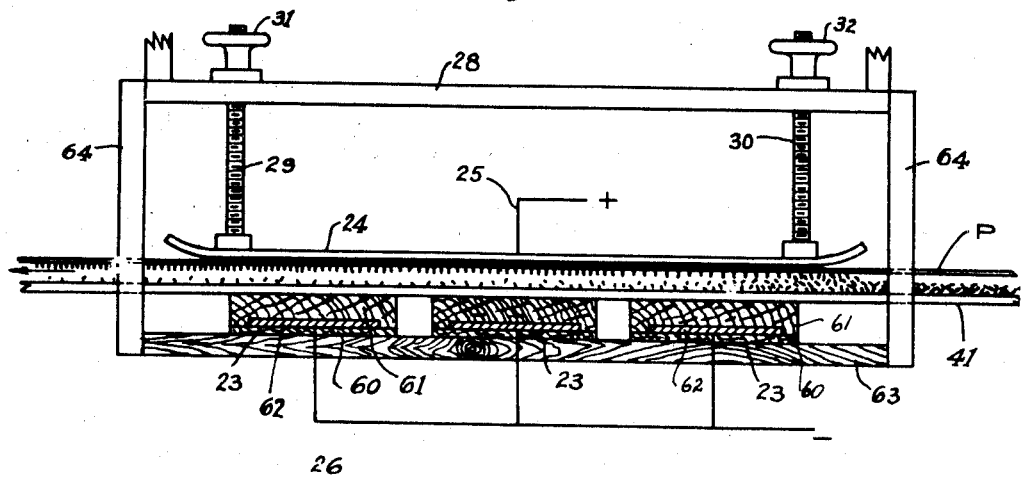
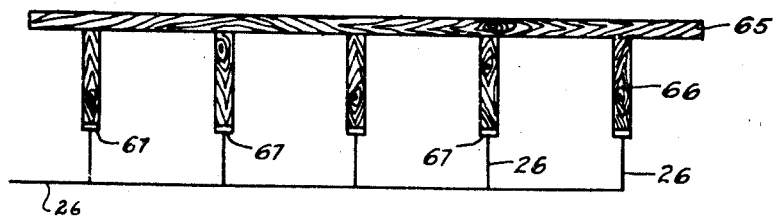
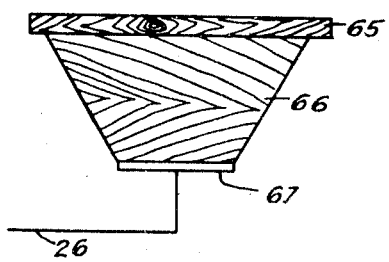
INVENTORS
ROMIE L. MELTON
RAYMOND C. BENNER
BY HENRY P. KIRCHNER
*R C Benner*
ATTORNEY Patented Jan. 16, 1940

2,187,624

UNITED STATES PATENT OFFICE 2,187,624

APPARATUS FOR THE MANUFACTURE OF COATED WEBS

Romie L. Melton, Raymond C. Benner, and Henry P. Kirchner, Niagara Falls, N. Y., assignors, by mesne assignments, to The Carborundum Company, Niagara Falls, N. Y., a corporation of Delaware Application October 10, 1932, Serial No. 636,982

12 Claims. (Cl. 91—18)

This invention relates to improved apparatus for the manufacture of granular coated webs of such materials as paper, cloth or the like and has for an object the provision of improved machinery for securing a superior product, greater efficiency and/or lower cost of production of coated articles.

Abrasive particles commonly used in the manufacture of abrasive coated webs are of irregular shape and have some surfaces or edges that are sharper than others and more suitable for abrading operations when these sharper surfaces, edges or points are positioned to engage the material being abraded. The usual method of applying granular particles to a web has been by dropping the particles from a hopper onto an adhesively coated web, and since the particles, when dropped, fall in a haphazard fashion, the usual method has not resulted in an orderly orientation of the particles.

It has been found heretofore that better granular coated webs for such purposes as abrading operations can be produced by causing at least some of the granular particles deposited upon the web to become so oriented that their longer axes project normally from the surface of the web. Various suggestions have been made for the employment of electrostatic fields in effecting orientation of the granular particles, but the machines heretofore proposed have not been entirely satisfactory, principally because they produce but very limited orientation of the particles. We have developed a machine by which a degree of orientation is secured that is far in excess of that obtained by the use of prior machines known to us, so that the abrasive paper or cloth made on a machine made in accordance with our invention is much sharper and greatly superior for grinding operations.

We have found that abrasive coated webs made by orienting a large proportion of the abrasive particles in such a manner that their longer dimensions are normal to the web to which they are attached, are decidedly faster cutting and more efficient than coated webs in which the particles are haphazardly arranged or in which but a relatively few of the abrasive particles are so oriented.

We have found that apparatus constructed in accordance with our invention will arrange a greater number of particles according to the desired orientation than any other apparatus heretofore known to us. Apparatus constructed in accordance with our invention differs from that heretofore known in that the positions of the granular particles are under control during the time they are susceptible to arrangement or rearrangement and does not require alteration of the web or of any part of the granular coated web to produce an electrically conductive article in order to secure the desired orientation.

We have found that a superior product can be obtained when the electrostatic field not only directs the particles toward the adhesive coated web, but also orients and propels the oriented particles into engagement with the adhesive coated web. Apparatus constructed in accordance with our invention produces a particularly good article because the particles are oriented and propelled by the action of the electrostatic field alone and are not detrimentally influenced by other forces, such as gravity, which materially offset the effect of the electrostatic field in producing a granular coated web in which the particles are arranged on the web in a certain desired position.

A better understanding of our invention can be secured by referring to the following drawings in which:

Figure 2 is an elevation, partly in section, of the device for electrostatically applying the grain; and Figures 3 and 4 are side and end elevations, respectively, of a modified form of bottom electrode.

Figure 1:
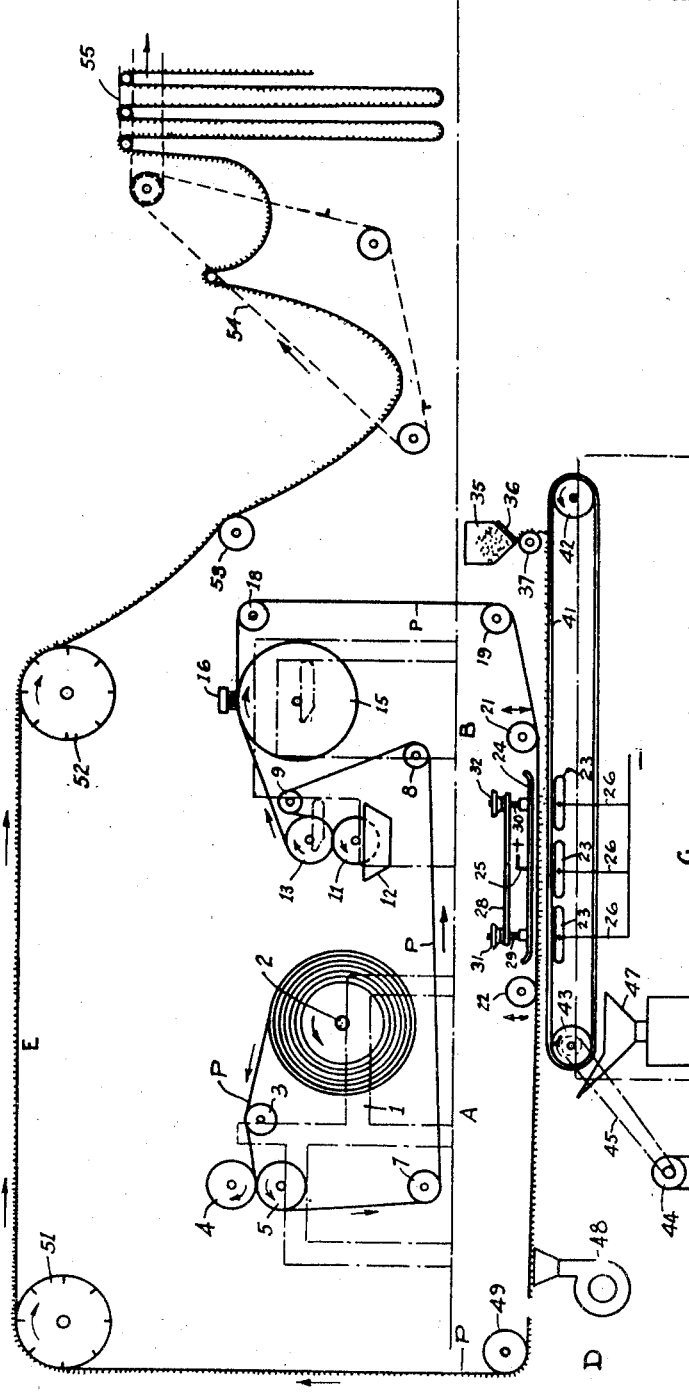
Figure 1 is a diagrammatic elevation of the complete apparatus.

Referring to the illustrated embodiment of the invention, there is a means A for holding and dispensing a roll 2 of the web P of paper, cloth or the like; means B for applying adhesive to one face of the web P; means C for applying granular material to the adhesive side of the web P; means D for causing a preliminary set of the adhesive; and means E for drawing the web through the coating apparatus and into a drying chamber.

The means A for holding and dispensing the web P comprises, as shown in the drawings, a frame 1 that supports the roll 2 of web P; an idler roll 3 for guiding the web; printing rolls 4 and 5 for marking the web with any desired legend or identification; and an idler roll 7 for guiding the web.

The adhesive applying means B comprise, as shown in the drawings, idler rolls 8 and 9 for guiding the web; a roll 11 positioned to dip into a pan 12 of adhesive; a roll 13 for maintaining contact between the web P and the roll 11; a drum 15 and an adhesive distributing brush 16 positioned above the said drum 15; and an idler roll 18 for guiding the web as it is brought from the distributing brush.

The means C for applying granular material to the web P comprises, as shown in the drawing, an idler roll 19 for guiding the web; rolls 21 and 22, which are adjustably positioned to move as a unit, for positioning the web; low conductivity electrodes 23 and a metal or good conducting electrode 24, the upper electrode 24 being adjustably spaced from the lower electrodes 23; an endless feed belt 41 of canvas or the like, positioned between the electrodes 23 and 24 and supported by the pulleys 42 and 43; a hopper 35 with an adjustable gate 36 and a roll 37 for dispensing the granular material to the feed belt 41; and variable speed driving means 44 for operating the feed belt 41.

The means C for applying granular material to the web P also comprises a source of electromotive force, the effective potential of which is 30,000 volts, or more, not specifically shown in the drawings, but indicated by the positive (+) and negative (−) symbols. The source of electromotive force may produce a continuous unidirectional current, an intermittent unidirectional current, or a pulsating current, such as either that which commonly is called alternating current or rectified alternating current. When a pulsating current is employed, the duration of the pulsations should be great enough to effectively project and orient the particles. Ordinarily, and for more efficient operation, the lower electrodes are connected to the negative terminal and the upper electrode 24 is connected to the positive terminal of the source of high electromotive force and is grounded also as a precautionary measure. The polarity of the electrodes 23 and 24 may be reversed, however, if it is so desired.

The means D for causing the adhesive to acquire a preliminary set comprises, as shown in the drawings, an idler roll 49 and a fan blower 48 for supplying a large volume of air at a low velocity to the adhesive and granular coated side of the web P.

The means E for drawing the web P from the coating apparatus into the drying chamber comprises, as shown in the drawings, one or more suction drums 51 and 52; an idler roll 53; a rack 55 for supporting the web P; and an endless conveyor 54 for transporting loops of the web P to the rack 55.

The character of the bottom electrodes 23 appears to be of great importance in the operation of our apparatus and preferably, are made of some poorly conducting material. The materials should be so poorly conducting that not enough current can flow along or through it to cause arcing between the bottom and top electrodes, yet it should be sufficiently conducting to allow a small leakage current to supply negative charges to the granular material in order that they may be repulsed from the feed belt across the electrostatic field toward the grounded upper electrode.

When we speak of a poorly conducting material, we use this expression to distinguish between such materials as metals, carbon, or the like, which are relatively good conductors of electricity, on the one hand, and highly insulating materials such as glass, hard rubber, varnished cambric or the like, which are such good insulators at the voltages we prefer to apply to our apparatus that the leakage current which flows through them is insufficient to charge the granular material to the degree necessary to cause it to be propelled to the adhesive coated web, on the other hand.

For this purpose, we have found ordinary dry, knot-free wood to be satisfactory. While dry wood is so poorly conducting that it will not carry enough current to allow spark over or arcing between the bottom and top electrodes, it is conductive enough to allow sufficient leakage at the operating voltages to supply the small amount of electrostatic charges required for the propulsion of the abrasive particles.

While we have found the ordinary dry pine wood free from knots to be the most satisfactory material so far used, other woods and other materials that ordinarily are classed as insulators but which are in fact, poor conductors of high tension electric current may be employed. Such materials include fibrous material bonded with an insulating resin such as "Bakelite" or "Redmanol". Such fibrous material should not have insulating laminations through it but the fibers should furnish poor electrical conducting paths from the lead-in wire to the upper electrode surfaces.

A better understanding of the construction of a suitable electrode can be had by reference to Figure 2, which shows in detail the grain deposition assembly including the lower electrodes 23.

The electrodes 23 as shown in Figure 2, are formed of pieces of wood 60 and 61 between which is placed a metal conductive plate 62. We have found it advantageous to use a distributing plate 62 in order to cause the charging current to divide and spread substantially evenly over the wooden electrode and also to reduce the specific density of leakage current upwardly through the wood to its top surface. We prefer to enclose the metal plate rather than to have it attached to the bottom of the electrode in order that leakage in other directions than that toward the upper surface of the electrode may be reduced. A good insulating material, such as glass, can be used instead of wood for the lower piece 60 of the electrode 23.

The electrodes 23 are supported on a frame member 63, which is hung from a support 28 by means of hanger bars 64 of highly insulating material such as hard rubber. The upper electrode 24, which can be of any good conducting material, is hung from the support 28 by means of screws 29 and 30 which are threaded into adjusting nuts 31 and 32 respectively.

While a number of lower electrodes 23 are shown in Figure 1 and Figure 2, a single electrode of corresponding area can be used. It is preferred, however, to use a number of sections as indicated in Figures 1 and 2, as this permits some of the electrodes to be disconnected in case the electrostatic field is to be shortened, or additional electrodes to be added in case the electrostatic field is to be lengthened.

Figures 3 and 4 illustrate a modified form of electrode suitable for use as a lower electrode in our apparatus. As illustrated in the drawings, it comprises a plate 65 of poorly conducting material and projecting legs 66, also of poorly conducting material, attached to the plate 65. A metal connecting lug 67 is attached to the lower end of each of these projections 66 in order to provide means for connecting each of the projections to the high potential source by means of a conductor 26.

Electrodes of the type described above, namely of a poorly conducting material, are applicable to uses other than that of apparatus for making electrostatically coated granular webs. The electrode per se and as used for general purposes is described and claimed in our copending application, Serial No. 647,244, filed December 14, 1932.

In the normal operation of the apparatus illustrated herein, a roll of the uncoated web P, such as paper or cloth, is rotatably mounted on the frame 1. The web is threaded over the roll 3 and between the printing rolls 4 and 5 and thence in contact with the idler rolls 7, 8 and 9 to the pressure roll 13 and the adhesive roll 11. The adhesive roll 11 dips into liquid adhesive contained in the adhesive tank 12, and by its rotation, applies a layer of adhesive to the web.

The adhesively coated material P passes between the brush drum 15 and a vibrating brush 16, which evenly distributes the adhesive and smooths out any ridges. It is then guided by the idler rolls 18, 19 and adjustable roll 21 into an electric field set up between the highly charged electrodes 23 and the low potential electrode 24.

Granular particles are distributed from the grain hopper 35 onto the grain feed belt 41, which moves through the electrical field parallel to the material P and in the same direction. As the granular material moves into and through the field, the particles leave the belt and move upward toward the web, where they become attached because of the adhesive coating. It is believed that the granules become electrically charged as they move between the upper and lower electrodes and that the electrical charge carried by the granules congregates towards the opposite ends where the curvature is greatest, thus forming electrical doublets. Forces produced by the electric field then turns the charged granules so that their major axes are parallel to the lines of force of the field, and then causes the longitudinally oriented granules to move upwardly until they strike the adhesive coating on the underside of the material P and adhere in a vertically oriented position. The oriented particles, instead of moving in a body from the belt to the adhesive coated web, move as a spray or rain of individual particles separately spaced from one another.

Observation of the space between the upper and lower electrodes, when the machine is in operation, shows a distinct bluish color and freedom from localized arcing or spark-over. The bluish coloration indicates that a corona field exists between the upper and lower electrodes. The grain particles on the belt may receive their negative electrostatic charges by conduction through the fibers of the belt, by induction, or by the corona discharge from the bottom electrode through the belt, and possibly by a combination of these. Whatever is the mechanism of the transmission of electrostatic charges to the grains, the fact remains that the granular particles receive sufficient electrostatic charge to cause them to be oriented and forcibly driven upwardly through the strong electrostatic field from the feed belt against the under side of the adhesive coated web.

In operating our apparatus we prefer to space the electrodes 23 and 24 about one inch apart and to apply a potential difference of between 30,000 and 100,000 volts. The potential difference applied to the electrodes is adjusted to such value that the abrasive particles on the feed belt 41 become charged and are propelled toward the upper plate 24 and strike the adhesive coating on the web P with sufficient force to partially embed themselves and adhere thereto. Other factors remaining constant, we have found that the voltage required to electrostatically propel the charged granules into engagement with the adhesively coated web varies in proportion to the size or mass of the granules; that is, a higher voltage is required for large grain than for a smaller size. For grits of from 50 to 200 mesh and finer we have found that potential differences of from 30,000 to 50,000 volts are suitable. Coarser grits require higher voltages and in the case of grits as large as 16 mesh, a potential difference of up to 90,000 volts may be required to orient and propel the granular material from the feed belt to the adhesive coated web. Thus, by means of the variable voltage apparatus we are able to adjust the potential difference applied to the electrodes to such a value that grain of a certain specific size will be electrically deposited on the adhesive coating, whereas any grain of a larger size, which might be present on the feed belt, will remain and be carried into the bin 47.

We have found it desirable to apply a surplus of grain to the feed belt 41, in order to assure a uniform granular coating and to eliminate inherent difficulties with grain feed rolls. A granular coating of the desired density can be obtained by varying the applied voltage or the spacing between the upper and lower electrodes to project a portion of the grain from the feed belt, even though the feed belt carries an excess of grain.

Immediately after leaving the grain deposition zone, the adhesive carried by the web is subjected to a preliminary drying or setting operation so that the granules will be retained in their oriented position. The coated web then passes around the idler roll 49 and suction drums 51 and 52 to a drying rack 55 where the adhesive is permitted to set fully.

Among the advantages possessed by apparatus constructed in accordance with our invention are its simplicity, its ease of operation and its flexibility or ease of adjustment to meet different requirements.

Not all kinds of granular materials are equally affected by electrostatic forces, some being readily affected and others being slightly affected or requiring intense or highly concentrated forces to produce an appreciable effect. Apparatus constructed in accordance with our invention is readily adaptable to these different degrees of susceptibility and is positive in action. When used with material that is readily susceptible to electrostatic forces, the intensity of the electrostatic field set up between the electrodes can be adjusted to produce a granular coated web of the desired characteristics. Adjustment of the intensity of the electrostatic field to a higher concentration or greater density causes less susceptible particles to act in the same manner as more susceptible particles act in a lower intensity field.

The intensity of the electrostatic field also can be adjusted to apply dense coatings of granular material on the web by merely increasing the intensity of the electrostatic field. Coatings of lesser density can be secured by decreasing the intensity of the electrostatic field.

The density of the coating of the granular material on the web also can be increased or decreased by adjusting the web closer to or farther from the surface of the granular material on the feed belt.

The apparatus constructed in accordance with our invention produces abrasive paper or cloth of an improved quality in that a larger proportion of the abrasive grains are oriented with their longest dimensions substantially normal to the surface of the paper or cloth. Tests have shown that with our apparatus, the greater part, and in some cases substantially all, of the grains that are susceptible of orientation are oriented normally to the face of the backing web. In the usual crushed granular abrasive material, some of the particles have one dimension much longer than the other dimensions, as in the case of splintery grains, or have two dimensions much longer than the other as in plate-like grains. This type of grain can be advantageously oriented to have their longest dimensions substantially normal to the surface of the paper or cloth backing. Some of the grains have all dimensions substantially the same, and consequently, can not be advantageously oriented. We have found, as above stated, that our apparatus orients the majority, if not practically all, of the grain that can be advantageously oriented. By employing a suitable method of separation, such as air separation, a granular material can be secured that has a much larger proportion of the elongated or splintery and plate-like type of grains than the usual granular material, and such material can be used to particular advantage in making abrasive paper and cloth on our machine.

The conditions to which the elongated particles are subjected in our machine are such as to secure the greatest degree of orientation upon the finished abrasive paper or cloth. The abrasive grain is carried into the electrostatic field in a quiescent condition. The particles are projected from the belt vertically upward by the projecting influence of the electrostatic field alone, which serves not only to project the particles, but also to turn the particles in a direction so that their longest dimensions will be parallel to the lines of electrostatic force or vertical. Since the web of paper or cloth is horizontal and with an adhesive coated face downward, the force of gravity assists rather than hinders the orientation of the particles with their longest dimensions normal to the surface of the paper or cloth because the particles are projected against the bottom of the adhesive coated paper or cloth and those longer particles that strike the adhesive coated surface tend to hang downward like pendulums. The effect of gravity, moreover, not only preserves the desired orientation but also tends to swing such particles that may have struck the surface in an inclined position downward into a position in which the major axes are substantially vertically downward from the adhesive surface. As shown in the drawings, the paper is maintained substantially horizontal until the adhesive is initially set to hold the grains thus oriented, before the paper is turned into a vertical direction.

The arrangement in which the web is passed substantially horizontally and with its adhesive coated side downwardly through the grain depositing and orienting device is particularly advantageous in securing good distribution and orientation of the grain on the backing. The loose mass of abrasive grain on the feed belt is not projected bodily upward at any one point when the feed belt passes between the electrodes. Instead, a relatively small proportion of the particles are projected upwardly at any one time and place. As a sufficient electric charge builds up on a particle, it is individually projected upwardly so that the appearance of the space between the electrode and the body of the paper is that of an upwardly directed rain or spray of particles that are spaced apart from each other. The particles that strike the adhesive coated surface stick to it, but the particles that strike already applied grains bound back against the belt. The length of the electrodes between which the web passes is such that the coating is gradually built up to the desired density. At no point is the grain projected in a concentrated mass or stream which would interfere with free orientation of the individual grains under the orienting influence of the electrostatic field.

The type of electrode herein described has been found to be of considerable importance because it permits the application of potential differences of sufficient magnitude, for example 100,000 volts, to be applied to the electrode without sparking or arcing between the electrodes to make it possible to project grains upwardly to the underneath surface of the web. When metal electrodes are used, the applied potential difference, as well as the closeness of the spacing of the electrodes, is very limited because a potential difference of 10,000 volts per inch of spacing is about the safe limit that can be applied without danger of arcing or spark-over. Thus, metal electrodes require greater spacing or lower applied potential differences, with the consequence that the intensity of the electrostatic field and the repulsion force exerted against the granular particles are materially reduced. By employing an electrode of the character described, namely a plate of poorly conducting material, potential differences up to 100,000 volts can be applied without arcing or spark-over when the electrodes are spaced about one inch apart. This makes it possible to produce an electrostatic field of far greater intensity than could be obtained by the use of metal electrodes.

Also, the relatively large size of the electrodes gives a substantially vertical electrostatic field over a considerable area as contrasted with a small electrode. If a small electrode were used, the tendency would be to give a dispersed electrostatic field that would tend to drive the abrasive particles out of the stronger portion into the weaker portion of the field.

The effect in area of the electrostatic field may be readily varied by moving or disconnecting some of the electrodes 23 thereby varying the density of the grain coating so as to give either a full-coated or open-coated abrasive paper or cloth.

The effect of projecting the grain as a sort of upwardly directed rain or spray of grain, by which a grain that strikes a free adhesive surface finds lodgement thereon, while a grain that strikes a point already covered by a previously deposited grain falls back, results in securing great uniformity in the application of the grain to the surface.

It will be noted further, as shown in the drawings, that at no time before the adhesive has set is the abrasive coated surface of the web brought into contact with rolls or other devices that would tend to flatten the grain.

As will be apparent from the above description, our apparatus successfully overcomes disadvantages inherent in various devices that have been proposed heretofore for the electrostatic deposition or orientation of grain upon abrasive paper or cloth.

It has been proposed to apply grain to a paper electrostatically by agitating the grain in a closed vessel containing an electrode and having an opening toward a coated paper, which is passed vertically upward in front of the opening. The grain is supposed, in this type of apparatus, to be projected horizontally. The grain, in this type of apparatus, is not projected from a quiescent state, as we have found to be of advantage, but is projected from an agitation chamber so that the grain as it moves is subjected to other forces than the electrostatic action. Moreover, when grain is projected against a vertically moving adhesive coated web, the tendency of gravity is to draw the longer particles downwardly into flat contact with the vertical web, as contrasted with our apparatus in which the effect of gravity is usefully employed in preserving the desired orientation until the adhesive has fully set.

In another type of apparatus, it has been proposed to deposit the grain by gravity upon the upper side of an adhesive coated web which is afterward passed through an electrostatic field. The grain falls haphazardly upon the adhesive coated surface and reliance is placed upon the possibility of turning of the grain already entrapped by the adhesive in order to orient it with its longest dimensions substantially normal to the surface of the paper. Due to the fact that the grains have become embedded in the adhesive, it is difficult if not impossible to change their position. If a long splintery grain has fallen flat against the adhesive coated surface, which will be its tendency under the influence of gravity, it is practically impossible to change its position, and hence apparatus of this type can produce a paper having but a very slight degree of orientation of the grain. The advantages of our type of apparatus, in which the grain is fully oriented before it reaches the adhesive coated surface, are apparent.

In another type of apparatus, it has been proposed to allow a stream of abrasive grains to fall by gravity against the upper surface of an adhesive coated web of paper or cloth, an electrode being disposed above the adhesive coated surface and at one side of the falling stream of grain. An electrode so placed, of necessity, must be relatively small and have a field of very limited intensity yet with its lines of force dispersed. An electrode of this type not only tends to drive the particles from the field, but also has little effect in properly orienting the particles, as contrasted with our large electrodes of relatively large field area in which the lines of force are substantially normal to the surface of the paper or cloth. The grain is applied moreover, in the former type of apparatus just referred to, in a concentrated stream at one point, so that the individual grains are not free to orient themselves, as in the case of our apparatus. The tendency of gravity, in any type of apparatus in which the grains are dropped toward the paper, even though they be dropped through an electrostatic field, is to cause the grains to dispose themselves with their longest dimensions parallel to the surface against which it is being deposited.

As contrasted with the various suggestions that have been made concerning apparatus for electrostatic orientation in which metal electrodes were to be used, with consequent restriction of the potential employed and electrode spacing, the high potential electrodes 23, as disclosed above, are of a poorly conducting material that permits the use of a high voltage electrostatic field without danger of spark-over. As pointed out above, this utilization of high potential differences is a distinct advantage.

Other advantages will be apparent from the foregoing disclosure to those skilled in the art and while specific embodiments have been used to illustrate our invention, it is to be understood that the invention is not limited to those embodiments but is defined by the appended claims.

We claim:

1. Apparatus for the manufacture of granular coated webs comprising an electrode of good conducting material positioned above and spaced apart from an electrode of sufficient conductivity to permit a leakage current to flow therethrough but of sufficient resistance to prevent spark-over or arcing to the upper electrode, means for applying a potential difference to the said electrodes, means for supporting an adhesive coated web between said electrodes and with an adhesive coated surface downward, and means for supplying granular particles between said web and the lower of said electrodes, said apparatus being adapted to electrostatically project granular particles against the downwardly facing adhesive surface of the web.

2. In combination, means for electrostatically projecting granular material upwardly comprising an electrode of good electrical conductivity positioned above and spaced apart from a plurality of electrodes of poor electrical conductivity and means for applying a potential difference to the said electrodes, means for passing an adhesive coated web between said upper and said lower electrodes and with an adhesive coated surface downwardly, means for supplying granular particles between said web and the said lower electrodes and means for causing the adhesive to acquire a preliminary set located adjacent to said electrostatic means for projecting granular material upwardly and in a position subsequent thereto with respect to the direction of movement of said web.

3. Apparatus for the manufacture of granular coated webs comprising electrodes arranged one above the other, means for applying a potential difference to the upper and lower electrodes, means for supporting an adhesive coated web between said electrodes with an adhesive coated surface thereof downward, means for supplying granular particles between said web and the lower of said electrodes, said apparatus being adapted to electrically project granular material against the downwardly facing adhesive surface of the web, said electrodes being so long in the direction of travel of the web that the coating of granular material is gradually built up to the desired density as the web travels between the electrodes.

4. Apparatus for the manufacture of granular coated webs comprising electrodes arranged one above the other, means for applying a potential difference to the upper and lower electrodes, means for supporting an adhesive coated web between said electrodes with an adhesive coated surface thereof downward, means for supplying granular particles between said web and the lower of said electrodes, said apparatus being adapted to electrically project granular material against the downwardly facing adhesive surface of the web, said electrodes being substantially flat and having both a substantial length and breadth with respect to the distance between them whereby a substantially uniformly directed electrostatic field is produced over a considerable area between them.

5. Apparatus for the manufacture of granular coated webs comprising electrodes arranged one above the other, means for applying a high electrical potential difference to the upper and lower electrodes, means for passing an adhesive coated web between said electrodes with the adhesive coated surface downward, means for conveying granular particles over the lower electrode and a body of poorly conducting material between the electrode and the particles, permitting a leakage current to flow therethrough, but of sufficient resistance to prevent arcing or sparkover from said electrode, whereby the particles are electrostatically charged by leakage current from said electrode and the charged particles are electrically projected upwardly against the downwardly facing adhesive surface of the web.

6. Apparatus for the manufacture of granular coated webs comprising electrodes arranged one above the other, the lower electrode having an upper facing of poorly conducting material to permit a leakage current to flow therethrough but of sufficient resistance to prevent arcing or spark-over between said electrodes, means for applying a high electrical potential difference between said electrodes, means for supporting an adhesive coated web between said electrodes with the adhesive coated face downward, a feed belt for carrying granular material over the lower electrode to be charged by leakage current therefrom and projected electrostatically upwardly against the downwardly facing surface of the web.

7. Apparatus for the manufacture of granular coated webs comprising electrodes arranged one above the other having opposing faces of substantial area, means for applying a high electrical potential difference to the upper and lower electrodes, means for passing an adhesively coated web between said electrodes with the adhesive coated surface downward, means for varying the spacing between said web and the lower electrode, and means for supplying granular particles between the web and the lower of said electrodes, said apparatus being adapted to electrostatically project granular material against the downwardly facing adhesive surface of the web.

8. Apparatus for the manufacture of granular coated webs comprising, electrodes arranged one above the other having opposing faces of substantial area, means for varying the spacing between said upper and lower electrodes, means for applying a high potential difference to said electrodes, means for passing an adhesive coated web between said electrodes with the adhesive surface downward, and means for supplying granular particles between the web and the lower of said electrodes, said apparatus being adapted to electrostatically project granular material against the downwardly facing adhesive surface of the web.

9. Apparatus for the manufacture of coated webs, comprising upper and lower electrodes, means for applying high electrical potential difference between them, means for passing an adhesive coated web between said electrodes with an adhesive coated surface thereof downward, and means for supplying particles between said web and the lower electrode, at least one of the electrodes consisting of a plurality of individual electrode units arranged to cover an area of such great length and width with respect to the distance between the upper and lower electrodes that the electrostatic lines of force are substantially normal to the surface of the web over the greater part of such area, said apparatus being adapted electrostatically to project the particles upwardly against the downwardly facing adhesive coated surface of the web.

10. Apparatus for the manufacture of coated webs, comprising upper and lower electrodes, a source of high electrical potential for applying a high electrical potential difference between them, means for passing an adhesive coated web between said electrodes with an adhesive coated surface thereof downward, and means for supplying particles between said web and the lower electrode, at least one of the electrodes consisting of multiple units arranged to cover an area of such great length and width with respect to the distance between the upper and lower electrodes that the electrostatic lines of force are substantially normal to the surface of the web over the greater part of such area, electrical switching means for selectively connecting the multiple units to the source of high electrical potential, said apparatus being adapted electrostatically to project the particles upwardly against the downwardly facing adhesive coated surface of the web.

11. Apparatus for the manufacture of coated webs, comprising upper and lower electrodes, means for applying a high electrical potential difference between them, means for passing an adhesive coated web between said electrodes with an adhesive coated surface thereof downward, and means for supplying particles between said web and the lower electrode, said electrodes covering an area of such great length and width with respect to the distance between them that the electrostatic lines of force are substantially normal to the surface of the web over the greater part of such area, said apparatus being adapted electrostatically to project the particles upwardly against the downwardly facing adhesive coated surface of the web.

12. Apparatus for the manufacture of coated webs, comprising upper and lower electrodes, a high tension electrical circuit connected to said electrodes whereby a high potential electrostatic field is produced between them, means for passing an adhesive coated web between said electrodes with an adhesive coated surface thereof downward, means for supplying particles between said web and the lower electrode, and a body of poorly conducting material interposed in the high tension electrical circuit and permitting a leakage current to flow therethrough, but of sufficient resistance to prevent arcing or spark-over between the electrodes, whereby the particles are electrostatically charged by the leakage current and the charged particles are electrostatically projected upwardly against the downwardly facing adhesive surface of the web.

ROMIE L. MELTON.
RAYMOND C. BENNER.
HENRY P. KIRCHNER.